United States Patent [19]

Chassot

[11] Patent Number: 5,348,580
[45] Date of Patent: Sep. 20, 1994

[54] STABILIZATION OF ORGANIC PIGMENTS

[75] Inventor: Laurent Chassot, Praroman, Switzerland

[73] Assignee: Ciba-Geigy Corporation, Ardsley, N.Y.

[21] Appl. No.: 111,530

[22] Filed: Aug. 25, 1993

[30] Foreign Application Priority Data

Sep. 3, 1992 [CH] Switzerland ............... 2763/92

[51] Int. Cl.$^5$ ............................................. C09B 67/50
[52] U.S. Cl. .................................. 106/410; 106/494; 106/495; 106/496; 106/497; 106/498; 106/499; 106/500; 106/505; 106/493
[58] Field of Search ............... 106/493, 494, 495, 496, 106/497, 498, 499, 500, 505, 410

[56] References Cited

U.S. PATENT DOCUMENTS

| | | | |
|---|---|---|---|
| 3,970,632 | 7/1976 | Yoshiura et al. | 524/87 |
| 4,210,612 | 7/1980 | Karrer | 524/204 |
| 4,276,401 | 6/1981 | Karrer | 526/263 |
| 4,294,949 | 10/1981 | Karrer | 526/262 |
| 4,413,075 | 11/1983 | DiBattista | 524/102 |
| 4,477,615 | 10/1984 | Raspanti et al. | 524/100 |
| 4,547,548 | 10/1985 | Cantatore | 525/186 |
| 4,838,943 | 6/1989 | Bitterli et al. | 106/400 |

FOREIGN PATENT DOCUMENTS

| | | |
|---|---|---|
| 0001803 | 5/1979 | European Pat. Off. |
| 0001835 | 5/1979 | European Pat. Off. |
| 0047967 | 3/1982 | European Pat. Off. |
| 0284800 | 10/1988 | European Pat. Off. |
| 0373839 | 6/1990 | European Pat. Off. |
| 0476612 | 3/1992 | European Pat. Off. |
| 3229640 | 3/1983 | Fed. Rep. of Germany |
| 234683 | 4/1986 | Fed. Rep. of Germany |
| 262439 | 11/1988 | Fed. Rep. of Germany |
| 50-58141 | 5/1975 | Japan |
| 57-119941 | 7/1982 | Japan |
| 299323 | 4/1990 | Japan |
| 2105731 | 3/1983 | United Kingdom |
| 2145100 | 3/1985 | United Kingdom |

OTHER PUBLICATIONS

Journal of Polymer Science 30, 983–988 (1992).
Makromol. Chem. Rapid Commun. 13, 125–133 (1992).
Makromol. Chem. 181, 595–633 (1980).
Chemistry Letters 1423–1426 (1988).
Journal of Polymer Science 10, 3295–3310 (1972).
Journal of Polymer Science 12, 1407–1420 (1974).
Makromol. Chem. 190, 975–983 (1989).
Makromol. Chem. 190, 3117–3125 (1989).
Derwent 89-122983/17 (Nov. 1988).
Derwent 22865 K/10 (Mar. 1983).
Derwent Abstract 86-205177/32 of DD 273230 (Sep. 4, 1986).
Derwent Abstract 35517b/19 of DT 2748362 (Mar. 5, 1979).

*Primary Examiner*—Karl Group
*Assistant Examiner*—Scott L. Hertzog
*Attorney, Agent, or Firm*—Michele A. Kovaleski; Luther A. R. Hall

[57] ABSTRACT

Pigment compositions comprising a) at least one organic pigment selected from the group consisting of diketopyrrolopyrroles, azo pigments quinacridones, quinophthalones, phthalocyanines, indanthrones, flavanthrones, pyranthrones, anthraquinones, perylenes, dioxazines, perinones, thioindigo, isoindolines isoindolinones and metal complexes and b) 0.01 to 100% by weight, based on the pigment, of a condensation or addition polymer, the recurring molecular unit of which contains at least one radical containing a nitroxyl or hydroxylamino group or is substituted by a side group containing a nitroxyl or hydroxylamino group, and copolymers thereof with one another or with nitroxyl- or hydroxylamine-free components.

These pigment compositions are distinguished by outstanding resistance to light and weathering.

24 Claims, No Drawings

STABILIZATION OF ORGANIC PIGMENTS

The present invention relates to the stabilization of organic pigments against the influence of light and weathering by addition of polymers comprising nitroxyl compounds.

It is known that not all organic pigments always have a very good fastness to light and weathering. Nevertheless, some of them have proved to be high-quality pigments. It has now been found that the resistance of conventional and even of high-quality pigments to light and weathering (especially in transparent pigment forms) surprisingly can be improved further if the pigments are mixed with a polymer comprising nitroxyl compounds.

Nitroxyl compounds are known as stabilizers from various publications. In JP-A 75-58141, amongst many other HALS (Hindered Amine Light Stabilizers), nitroxyl compounds which, together with UV absorbers, serve to stabilize pigmented plastics against the influence of light are also described. It is stated that the action of UV absorbers as light stabilizers for the plastic is impaired by the pigments, but that this impairment can be reduced by an HALS. HALS which contain no nitroxyl group are preferred. A polymer composition which comprises a quinophthalone pigment and, due to the addition of HALS, has a high light stability and resistance to fading is described in U.S. Pat. No. 3,970,632. Although nitroxyl compounds am also included quite generically, only HALS which are free from nitroxyl groups are mentioned specifically. Polymeric HALS are likewise known as stabilizers of polymers against degradation by light, and are described as such, for example, in U.S. Pat. Nos. 4,210,612, 4,276,401 and 4,294,949, in DE-A 3 229 640 and in DD-PS 262 439. HALS which are free front nitroxyl groups are also preferred according to these publications, in which the nitroxyl compounds are also included generically. Pigmented polymers comprising a UV absorber and an HALS (without reference to nitroxyl compounds) for the prevention of fading are known from JP-A 82-119941. Laminates which are stabilized against fading by the action of light and comprise, in an intermediate layer, a dye (erroneously called a pigment) which is soluble in an organic solvent and has been treated with a nitroxyl compound in the dissolved form are described in JP-A 90-99323.

For one skilled in the art, these publications reveal the teaching that in the case of plastics dyed with soluble dyes, fading by the action of light can be reduced under certain conditions, for example in intermediate layers of laminates, by treatment of the dissolved dyes with a nitroxyl compound, but that the same effect is achieved in plastics pigmented with pigments, together with stabilization of the plastic, by admixing an HALS which is free from nitroxyl groups.

It has now been found that the resistance of certain pigments of the classical and even of the high-performance type to light and weathering quite surprisingly can be improved further by mixing or coating the pigment particles with a polymer which comprises nitroxyl compounds or corresponding precursors containing the group N—O—( N—OH, N—O—alkyl).

The present invention accordingly relates to light-stabilized pigment compositions comprising a) at least one organic pigment selected from the group consisting of diketopyrrolopyrroles, azo pigments, quinacridones, quinophthalones, phthalocyanines, indanthrones, flavanthrones, pyranthrones, anthraquinones, perylenes, dioxazines, perinones, thioindigo, isoindolines, isoindolinones and metal complexes and b) 0.01 to 100% by weight, based on the pigment, of a condensation or addition polymer, the recurring molecular unit of which contains at least one radical containing a nitroxyl or hydroxylamino group or is substituted by a side group containing a nitroxyl or hydroxylamino group, and copolymers thereof with other such compounds or with nitroxyl- or hydroxylamine-free components.

Particularly suitable pigments are those of the isoindoline, isoindolinone, metal complex and, in particular, the diketopyrrolopyrrole, azo, quinacridone, phthalocyanine, anthraquinone and perylene series. These are generally known and in some cases commercially obtainable products. The invention particularly relates to compositions comprising relatively unstable (classical) pigments or high-performance pigments in fine (transparent) form. Diketopyrrolopyrrole pigments are very especially preferred, especially if used in a fine form having an average particle size of $0.005+0.1$ $\mu$m.

The polymeric nitroxyl compounds are likewise known compounds. They are disclosed, for example, in the following publications:

F. E. Karrer, Makromol. Chem. (1980), 595–633;

T. Osa et al., Chem. Letters (1988), 1423–1426;

T. Kurosaki et al., J. Polymer Science 10 (1972), 3295–3310;

T. Kurosaki et al., J. Polymer Science 12 (1974), 1407–1420;

R. Seidemann et al, Makromol. Chem. 190, 975–983; and

L. Dulog et al., Makromol. Chem. 190 (1989), 3117–3125.

Any novel polymeric nitroxyl compounds as defined above which can be used can be prepared by methods analogously to generally known methods, if appropriate from known HALS, such as are described, for example, in EP-A 1835, U.S. Pat. No. 4,210,612, DE-A 32 29 640, EP-A 47 967, U.S. Pat. Nos. 4,547,548, 4,477,615, and 4,413,075.

The nitroxyl compound is preferably employed in an amount of 0.1–10, and in particular 0.5–15% by weight, based on the pigment.

Inorganic or organic salts of nitroxyl compounds, which are formed by addition of acids in maximum amounts equivalent to the nitroxyl groups, can also be used. Such acids can be inorganic acids, for example sulfuric, hydrochloric or phosphoric acid, or organic carboxylic acids, such as formic, acetic, oxalic, maleic, benzoic or salicylic acid, organic sulfonic acids, such as methane- or p-toluenesulfonic acid, or organic phosphorus-containing acids, such as diphenylphosphoric acid, methanephosphoric acid or diphenylphosphinic acid.

Particularly suitable polymeric nitroxyl compounds are condensation or addition polymers, the recurring molecular unit of which contains at least one radical of the formula

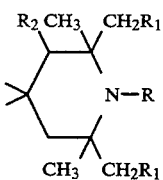 (I)

or is substituted at least once, directly or indirectly, by one of the side groups of the formulae

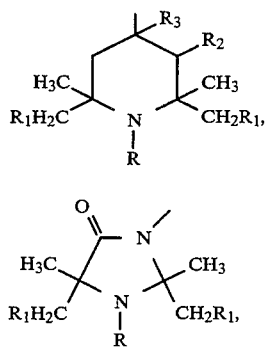

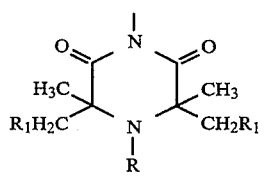 (IV)

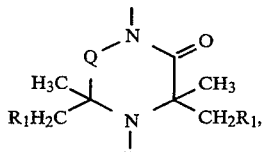 (V)

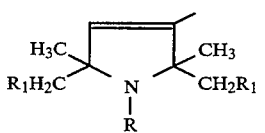 (VI)

or

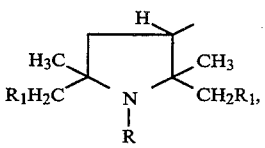 (VII)

in which
R is O. or OH,
$R_1$ is hydrogen or $C_1$–$C_4$alkyl,
$R_2$ is hydrogen or $C_1$–$C_4$alkyl,
$R_3$ is hydrogen or a free valency and
Q is —$CH_2$—, —$(CH_2)_2$— or —$CH_2$—$CH(CH_3)$—,
and copolymers with other such compounds or with nitroxyl- and hydroxylamine-free components.
R is preferably O.

Condensation and addition polymers are to be understood as meaning those polymers which are prepared by a polycondensation or polyaddition reaction. Examples of these are polyesters, polyethers, polyolefins, polyamides, polyimides, polyurethanes, polyureas, polyphosphates, polyphosphonates, polycarbonates, polyacetals, phenol/formaldehyde resins or polyphosphazenes and copolymers thereof. Polyesters, polyethers, polyolefins, polyamides and polyphosphate are preferred.

The average molecular weight $M_w$ of these polymers is advantageously between 2000 and 100,000, preferably between 5000 and 20,000. It is determined by the generally known method of gel permeation chromatography (GPC).

Of the condensation and addition polymers as defined above, those in which the recurring molecular unit contains at least one radical of the formula

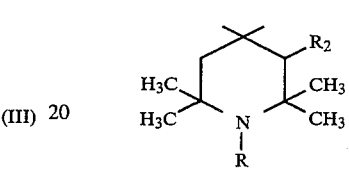 (VIII)

or is substituted at least once, directly or indirectly, by a side group of the formula

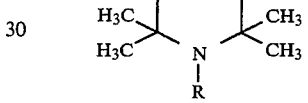 (IX)

in which R, $R_2$ and $R_3$ are as defined above, are of quite particular interest.

Preferred polymers are those in which the recurring molecular unit contains at least one radical of the formula

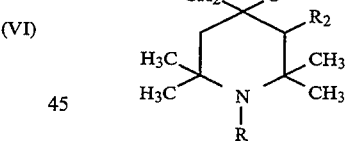 (X)

or

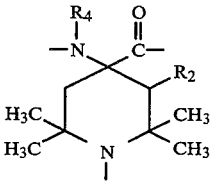 (XI)

or is substituted at least once by a side group of the formula

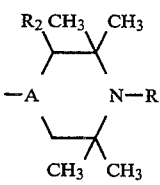 (XII)

in which

A is a group of the formula

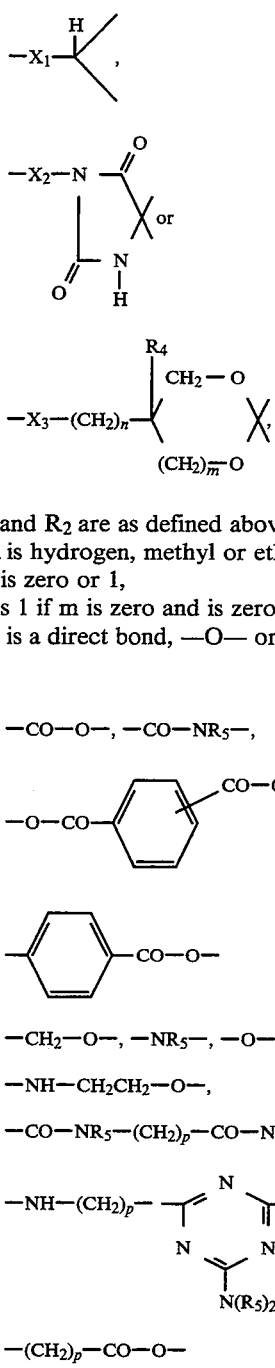

(XIII)

(XIV)

(XV)

R and R$_2$ are as defined above,
R$_4$ is hydrogen, methyl or ethyl,
m is zero or 1,
n is 1 if m is zero and is zero or 1 if m is 1,
X$_1$ is a direct bond, —O— or a group of the formula

—CO—O—, —CO—NR$_5$—,

—O—CO—⟨phenyl⟩—CO—O—,

—⟨phenyl⟩—CO—O—

—CH$_2$—O—, —NR$_5$—, —O—CH$_2$CH$_2$—NH—,

—NH—CH$_2$CH$_2$—O—,

—CO—NR$_5$—(CH$_2$)$_p$—CO—NH—,

—NH—(CH$_2$)$_p$—⟨triazine with NR$_5$ and N(R$_5$)$_2$⟩—NR$_5$—,

—(CH$_2$)$_p$—CO—O— in which

R$_5$ is hydrogen, C$_1$-C$_{12}$alkyl, C$_5$-C$_7$cycloalkyl or C$_7$-C$_{11}$ aralkyl and
p is a number between 1 and 6,
X$_2$ is a direct bond or a group of the formula —(CH$_2$)$_p$—, —CO—O—CHR$_5$—CH$_2$— or —CO—NR$_4$—CHR$_5$—CH$_2$—
wherein R$_4$, R$_5$ and p are as defined above, and
X$_3$ is a direct bond, —O— or a group of the formula —CO—O—, —O—CH$_2$—O— or —(CH$_2$)$_p$— in which p is as defined above.

The following polymers are particularly preferred:

a) Polymers of the same type as are disclosed in EP—A 1835 (claim 1), having a recurring unit of the formula

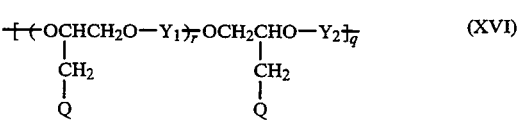

(XVI)

in which Q is a radical of the formula XII in which A is a group —O—CH ,

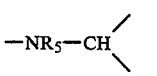

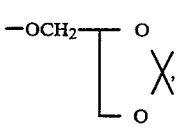

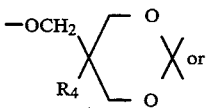

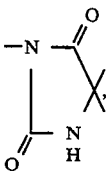

R, R$_2$, R$_4$ and R$_5$ are as defined above,
q is a number between 10 and 50 and
r is zero or 1, and
if r is zero,
Y$_2$ is an aliphatic, aromatic, araliphatic or alicyclic diacyl group having up to 20 carbon atoms,
if r is 1 and Q is a radical of the formula XII in which A is

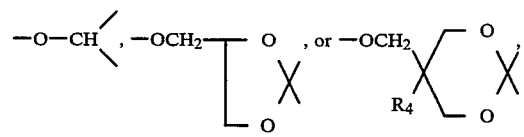

Y$_1$ is a saturated, aliphatic diacyl group having up to 20 carbon atoms, a benzenedicarbonyl group, a cyclohexanedicarbonyl group or a group

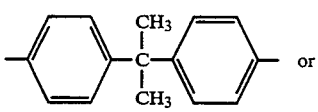

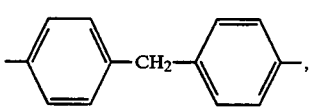

and if r is 1 and Q is a radical of the formula XII in which A is

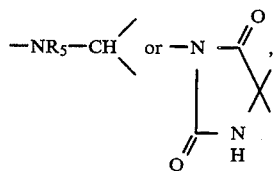

Y₁ is a saturated, aliphatic diacyl group having up to 20 carbon atoms, a benzenedicarbonyl group, a cyclohexanedicarbonyl group or a group

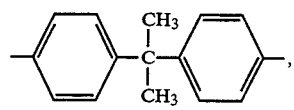

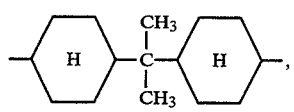

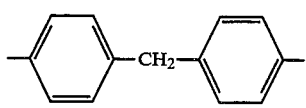

or

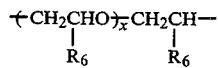

in which x is zero or a number from 1 to 8 and R₆ is hydrogen or methyl, and
if r is 1,
Y₂ is a saturated, aliphatic diacyl group having up to 20 carbon atoms, a benzenedicarbonyl group, a cyclohexanedicarbonyl group, an alkylene group having 2 to carbon atoms, a xylylene group or a group

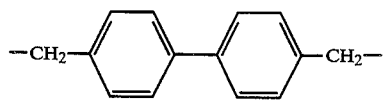

in which Y₃ is an alkylene group having 2 to 10 carbon atoms or a phenylene group, which is unsubstituted or substituted by methyl.
b) Polymers such its are disclosed in U.S. Pat. No. 4,210,612 (columns 1 and 2), having a recurring unit of the formula

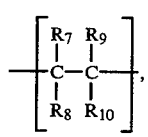

(XVII)

in which
R₇ is a group of the formula

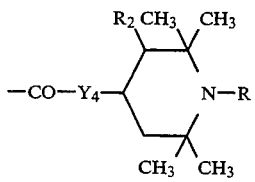

or

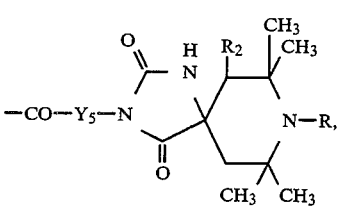

in which
R and R₂ are as defined above,
Y₄ is —O— or —NR₅—,
in which R₅ is its defined above,
Y₅ is a group —O—(CH₂—CH₂)_z— or —NR₅—(CH₂—CH₂)_z— in which z is zero or 1.
R₈, R₉ and R₁₀ independently of one another are hydrogen or C₁-C₄alkyl,
R₉ is additionally also —COOH, and, if R₈ and R₁₀ are hydrogen,
R₇ and R₉ together form a group of the formula

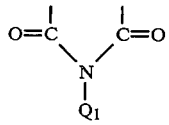

in which
Q₁ is a group

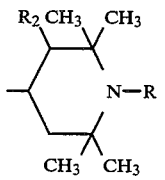

in which R and R₂ are as defined above, and copolymers of XVII with a compound containing at least one polymerizable double bond, at least one recurring unit XVII being present per 10 co-components.
c) Copolymers such as are disclosed in DE-A 32 29 640 (pages 2–5), of
1) at least one unsaturated derivative of the formula

R₁₂—Y₆—CO—CH=CH—CO—Y₇—R₃ (XVIII), and
2) at least one comonomer of the formula

(XIX)

in which $R_{12}$ is a group of the formula XII as defined above and $R_{13}$ is hydrogen, $C_1$-$C_{12}$alkyl, which can be interrupted by —O—, $C_3$-$C_5$alkenyl, $C_7$-$C_{11}$aralkyl or $C_5$-$C_7$cycloalkyl or is the same as $R_{12}$, $Y_6$ and $Y_7$ independently of one another are —O— or —$NR_5$—, in which $R_5$ is as defined above, $R_{14}$ is hydrogen or methyl, $R_{15}$ is hydrogen, $C_1$-$C_{12}$alkyl, phenyl, Cl, CN, $C_1$-$C_4$alkoxy, $C_2$-$C_5$alkanoyloxy, —$CONH_2$, —$COOR_{16}$, —$OR_6$ or —$CONR_{17}R_{18}$, $R_{16}$ is hydrogen, $C_1$-$C_{12}$alkyl, $C_2$-$C_4$hydroxyalkyl or a group of the formula XII as defined above, $R_{17}$ is $C_1$-$C_{12}$alkyl, $C_5$-$C_7$cycloalkyl, phenyl or a group $Q_2$ of the formula

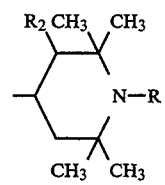

in which

R and $R_2$ are as defined above, $R_{18}$ is hydrogen, $C_1$-$C_{12}$alkyl, $C_5$-$C_7$cycloalkyl or $C_7$-$C_{11}$aralkyl, or $R_{17}$ and $R_{18}$, together with the N atom to which they are bonded, form a 5- to 7-membered heterocyclic ring selected from the group consisting of pyrrolidine, piperidine, morpholine or 4-alkylpiperazine, or copolymers of 1) at least one maleimide of the formula

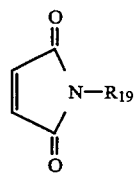

in which $R_{19}$ is a group $Q_2$, and 2) at least one comonomer of the formula $CH_2$=CH—$R_{20}$ in which $R_{20}$ is hydrogen or $C_1$-$C_{12}$alkyl.

d) Homopolymers having a recurring unit of the formula

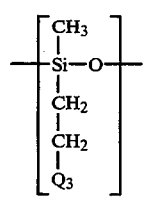 (XX)

in which $Q_3$ is a group of the formula

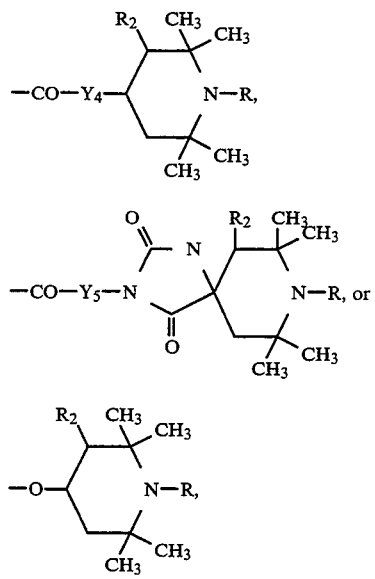

in which

R and $R_2$ are as defined above, $Y_4$ is —O— or —$NR_5$—, in which $R_5$ is as defined above, $Y_5$ is a group —O—($CH_2$—$CH_2$)$_z$— or —$NR_5$—($CH_2$—$CH_2$)$_z$— in which z is zero or 1, in which z is zero or 1, and copolymers of XX with a compound containing at least one polymerizable double bond, at least one recurring unit XX being present per 10 co-components.

e) Polymers of the same type as are disclosed in EP-A 47967 (claim 1), i.e. polymers obtained by condensation of a compound of the formula

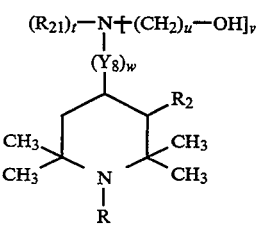 (XXI)

in which

R and $R_2$ are as defined above, $R_{21}$ is hydrogen, $Y_8$ is a group —($CH_2$)$_u$—NH—, u is a number from 1 to 4, t is zero or 1, w is zero or 1 and v is 1 or 2, with the proviso that if v is 2, t is zero, with a diisocyanate of the formula

O=C=N—$Y_9$—N=C=O (XXII)

in which $Y_9$ is a group

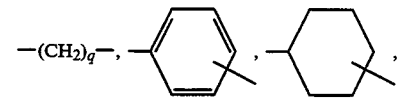

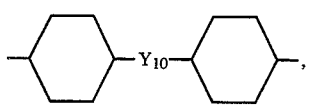

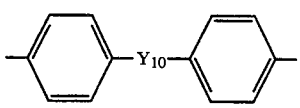

in which
Y₁₀ is a direct bond, —(CH₂)$_b$—, —NR₂₂—, —O—, —S— or —SO₂—,
a is a number from 1 to 10 and
b is a number from 1 to 5 and
R₂₂ is $C_1$-$C_4$alkyl.

f) Polymers such as are disclosed in U.S. Pat. No. 4,547,548 (column 2), of the formula

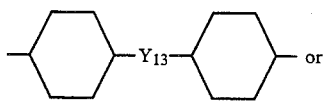

in which Y₁₃ is a direct bond or —(CH₂)$_{1-10}$,
Y₁₂ is $C_2$-$C_{10}$hydroxyalkylene, $C_4$-$C_8$alkenylene or a group —CO—, —OOC—Y₁₁—COO—, —COO—Y₁₁—OOC—, —OCNH—Y₁₁—NH-CO—, —HNOC—Y₁₁—CONH— or —O-C—Y₁₁—CO—,
the ratio of c:d being between 4:1 and 1:4.

g) Polymers of the same type as are disclosed in U.S. Pat. No. 4,477,615 (columns 1-3), having a recur-

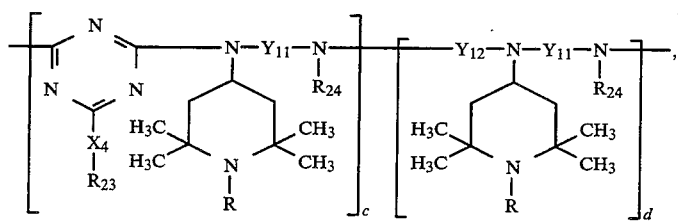

(XXIII)

in which
R is as defined above,
R₂₃ is hydrogen, $C_1$-$C_{12}$alkyl, $C_2$-$C_{12}$alkyl, which is substituted by —OH, $C_1$-$C_4$alkyl or $C_2$-$C_8$-dialkylamino, or is $C_3$-$C_5$alkenyl, $C_5$-$C_7$cycloalkyl, $C_6$-$C_{18}$aryl, $C_7$-$C_{11}$aralkyl or a group

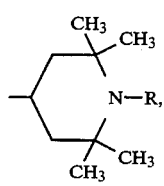

R₂₄ is $C_5$-$C_7$cycloalkyl, $C_6$-$C_{18}$aryl, $C_7$-$C_{11}$aralkyl or a group of the formula

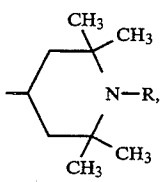

X₄ is —O—, —S— or —NR₂₅—,
in which R₂₅ can be the same as defined for R₂₃,
R₂₃X₄-regarded as a single substituent can also be a heterocyclic radical selected from the group consisting of pyrrolidin-1-yl, piperidin-1-yl, hexahydroazepin-1-yl, morpholin-4-yl or methylpiperazin-1-yl,
Y₁₁ is $C_2$-$C_{10}$alkylene, $C_4$-$C_{10}$alkylene, which is interrupted by 1 or 2 oxygen or —NH— groups, cyclohexane, phenylene, a group ring unit of the formula

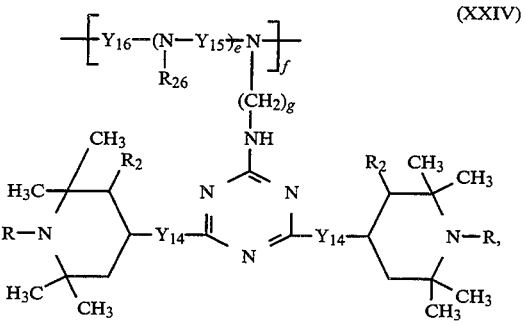

(XXIV)

in which
R and R₂ are as defined above,
Y₁₄ is —O— or —NR₁₈—,
in which R₁₈ is $C_1$-$C_{12}$alkyl, $C_5$-$C_7$cycloalkyl or $C_7$-$C_{11}$aralkyl,
g can be a number from 2 to 12,
Y₁₅ is the group —(CH₂)$_g$—,
in which g is as defined above,
or the group

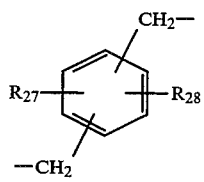

in which
R₂₇ and R₂₈ independently of one another are hydrogen or methyl, or

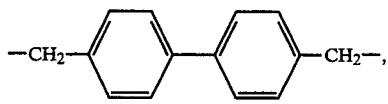

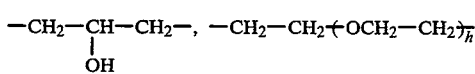

in which h can be 1 to 3, $R_{26}$ is hydrogen, $C_1$-$C_{12}$alkyl, a group of the formula

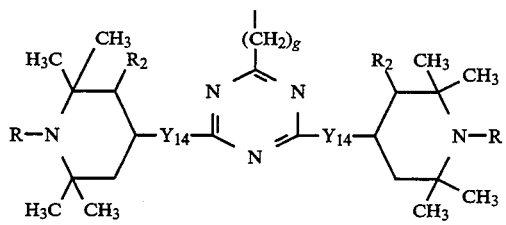

in which

R, $R_2$, $Y_{14}$ and g are as defined above, or a group of the formula

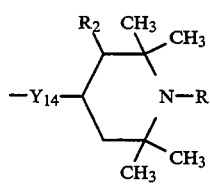

as defined above, e is zero or 1, $Y_{16}$, if e is zero, is as defined for $Y_{15}$ or is a group

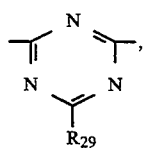

—OC—$Y_{17}$—CO—, —OCHN—$Y_{18}$—NHCO—, —COO—$Y_{19}$—OOC— or —$CH_2$—$Y_{20}$—CO— in which $R_{29}$ is hydrogen, $C_1$-$C_{12}$alkyl, $C_5$-$C_7$cycloalkyl, $C_3$-$C_5$alkenyl, $C_7$-$C_{11}$aralkyl, phenyl, which is unsubstituted or substituted by $C_1$-$C_4$alkyl, or a group

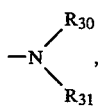

—O—$R_{30}$ or —S—$R_{30}$ in which $R_{30}$ and $R_{31}$ independently of one another are hydrogen, $C_1$-$C_{12}$alkyl, $C_5$-$C_7$cycloalkyl, $C_7$-$C_{11}$aralkyl or phenyl, which is unsubstituted or substituted by $C_1$-$C_4$alkyl, or $R_{30}$ and $R_{31}$, together with the N atom to which they are bonded, form piperidine or morpholine, or $R_{29}$ is a group

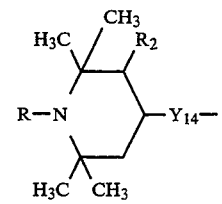

as defined above, $Y_{17}$ is

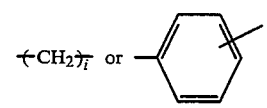

in which i is a number from 1 to 8, $Y_{18}$ is

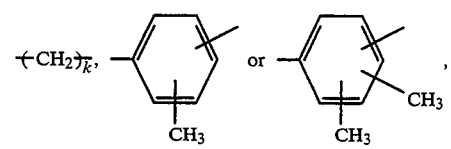

$Y_{19}$ is

in which k is a number from 2 to 18, $Y_{20}$ is

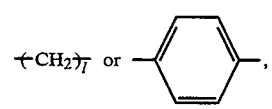

in which l is 1 or 2, and f can be a number between 2 and 2000.

h) Polymers of the same type as are disclosed in U.S. Pat. No. 4,413,075 (columns 1 and 2), having a recurring unit of the formula

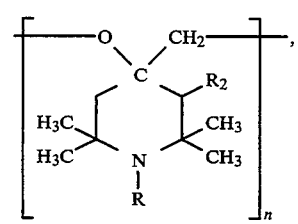

(XXV)

in which

R and $R_2$ are as defined above and y can vary between 10 and 100.

Any alkyl substituent can be a branched or unbranched alkyl group. Examples of these are —in the context of the C number defined—methyl, ethyl, isopropyl, butyl, sec-butyl, tert-butyl, isoamyl, n-hexyl;, 2-ethylbutyl, n-octyl, 2-ethylhexyl, n-decyl or n-dodecyl.

$C_3$–$C_5$Alkenyl is, for example, allyl, methallyl or dimethylallyl.

$C_7$–$C_{11}$Aralkyl is to be understood as meaning, for example, benzyl, phenylethyl, phenylpropyl or naphthylnethyl. Benzyl is preferred.

$C_5$–$C_7$Cycloalkyl is, for example, cyclopentyl, cycloheptyl and, in particular, cyclohexyl.

An aliphatic, aromatic, araliphatic or alicyclic diacyl group having up to 20 carbon atoms is, for example, one of the groups of the formulae

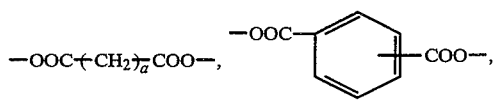

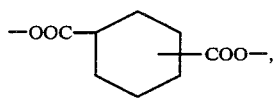

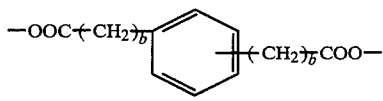

in which a and b are as already defined above, i.e. are a number between 1 and 10 or, respectively, between 1 and 5.

$C_6$–$C_{18}$Aryl is, for example, phenyl, biphenyl or naphthyl, each of which is unsubstituted or substituted by one or two $C_1$–$C_4$alkyl substituents.

$C_2$–$C_{10}$Alkylene is to be understood as meaning, for example, ethylene, n-propylene, tetramethylene, 2,2-dimethylpropylene, pentamethylene, octamethylene or decamethylene.

$C_4$–$C_8$Alkenylene is, for example, 2-butenylene, 2-hexenylene, 3-hexenylene or 2-octenylene.

Polymers which are very especially preferably used are those having a recurring unit of the formula

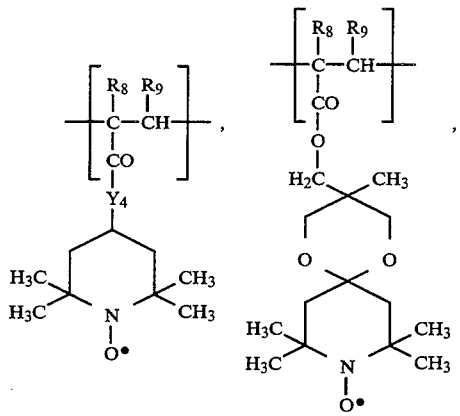

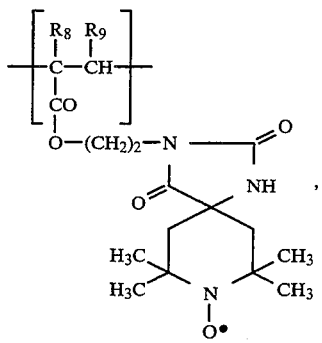

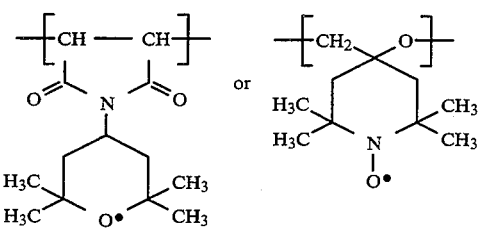

in which
  $R_8$ and $R_9$ independently of one another are hydrogen or methyl and
  $Y_4$ is —O— or —NH—,
and in which recurring units of the formula

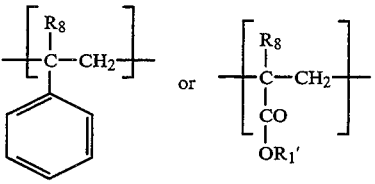

in which
  $R_8$ is as defined above and
  $R_1'$ is hydrogen or methyl, can also occur,
but in particular polymers having a recurring unit of the formula

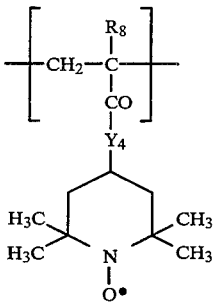

in which
  $R_8$ is hydrogen or methyl and
  $Y_4$ is —O— or —NH—.

As already mentioned above, the pigments are stabilized against the action of light and weathering, which can lead either to fading or, in some cases, also to darkening of the coloured coating, by admixing with a polymeric nitroxyl compound. The admixing according to the invention of the polymeric nitroxyl compound with the pigment has proved to be effective, i.e. stabilizing, in both cases. The invention furthermore accordingly relates to a process for light- and weathering-stabilization of pigments selected from the group consisting of diketopyrrolopyrroles, azo pigments, quinacridones, quinophthalones, phthalocyanines, indanthrones, flavanthrones, pyranthrones, anthraquinones, perylenes, dioxazines, perinones, thioindigo, isoindolines, isoindolinones and metal complexes, by mixing or coating the pigment particles with 0.01 to 100% by weight, based on the pigment, of a condensation or addition polymer, the recurring molecular unit of which contains at least one radical containing a nitroxyl or hydroxylamino group or is substituted by a side group containing a nitroxyl or hydroxylamino group, and copolymers thereof with other such compounds or with nitroxyl- or hydroxylamine-free components. Instead of the nitroxyl compound, it is also possible to employ a corresponding precursor containing the group N—OT, in which T is $C_1$–$C_{12}$alkyl, which liberates the nitroxyl compound during heat treatment.

This can be effected by the following various methods:

The polymeric nitroxyl compound is dissolved in an organic solvent in the desired amount. The pigment is suspended in this solution by customary methods and, if appropriate, the resulting suspension is ground in a conventional mill. The pigment mixture is isolated by distilling off the solvent or by filtration and is then dried.

The required amount of the polymeric nitroxyl compound, dissolved in an organic solvent, is added to a pigment suspension prepared by customary methods and is then precipitated and co-suspended by addition of a solvent in which it is insoluble, for example water. The suspension is then filtered and the pigment mixture is isolated by customary methods;

The polymeric nitroxyl compound is added to and co-suspended in a suspension prepared by customary methods. The suspension is then filtered, with or without addition of a further solvent, and the solid substance is isolated;

A mixture of the organic pigment with the polymeric nitroxyl compound in the desired mixing ratio is ground in a conventional ball mill in the presence of a solvent by customary methods. The product is isolated by filtration or by distilling off the solvent;

The organic pigment is mixed or coated with a polymeric compound containing radicals of the formula I in which R is hydrogen, and the amino groups are then oxidized to nitroxyl by oxidation by generally known methods;

The organic pigment is mixed or coated with a polymeric compound containing radicals of the formula I in which R is $C_1$–$C_{12}$alkoxy, and the aminoether group is then cleaved to nitroxyl by heat treatment;

The organic pigment is mixed or coated with a polymeric compound which contains a reactive side group and the resulting product is then reacted with a reactive nitroxyl compound;

Preferably, however, the pigment and the polymeric nitroxyl compound are incorporated in the desired ratio of amounts by customary methods, either in premixed form or separately, into the substrate to be pigmented.

The pigment compositions according to the invention are excellently suitable as pigments for colouring high molecular weight organic material, especially if high requirements of resistance to light and weathering are imposed.

High molecular weight organic materials which can be pigmented with the pigment compositions according to the invention are, for example, cellulose ethers and esters, such as ethylcellulose, nitrocellulose, cellulose acetate and cellulose butyrate, naturally occurring resins or synthetic resins, such as polymerization resins or condensation resins, such as amino resins, in particular urea-and melamine-formaldehyde resins, alkyd resins, phenolic resins, polycarbonates, polyolefins, polystyrene, polyvinyl chloride, polyamides, polyurethanes, polyesters, ABS, polyphenylene oxides, rubber, casein, silicone and silicone resins, individually or as mixtures.

The high molecular weight organic materials mentioned can be, as individual materials or mixtures, in the form of plastic compositions, melts, spinning solutions, paints, coating compositions or printing inks.

The pigment compositions according to the invention are particularly suitable or colouring polyvinyl chloride and polyolefins, such as polyethylene and polypropylene, and for pigmenting paints, coating compositions and printing inks. Due to their high resistance to light, however, they are also particularly suitable for use in electrophotographic materials (for example photocells), colour filters (for example liquid crystal displays), information storage materials (optical discs), non-linear optical materials and in optical limiters.

However, the pigment compositions according to the invention are preferably suitable for colouring aqueous and/or solvent-containing paints, in particular automobile paints. They are very especially preferably used for effect paint finishes in which transparent organic pigments are employed.

The high molecular weight organic materials mentioned can be, as individual materials or mixtures, in the form of plastic compositions, melts, spinning solutions, paints, coating materials or printing inks. Depending on the intended use, it proves advantageous to employ the pigment compositions according to the invention as toners or in the form of preparations.

The pigment compositions according to the invention can be employed in an amount of 0.01 to 40% by weight, preferably 0.1 to 10% by weight, based on the high molecular weight organic material to be pigmented.

The high molecular weight organic substances are pigmented with the pigment compositions according to the invention, for example, by admixing such a pigment composition, if appropriate in the form of masterbatches, or the individual components of these substrates using roll mills or mixing or grinding apparatuses. The pigmented material is then brought into the desired final form by processes which are known per se, such as calendering, pressing, extrusion, brushing, casting or injection moulding. To produce non-rigid mouldings or to reduce their brittleness, it is often desirable to incorporate so-called plasticizers into the high molecular weight compounds before shaping. Plasticizers can be, for example, esters of phosphoric acid, phthalic acid or sebacic acid. The plasticizers can be incorporated into the polymers before or after incorporation of the pigment compositions according to the invention. In order to achieve various colour shades, it is furthermore possible also to add fillers or other colouring constituents, such as white, coloured or black pigments, in any amounts, to the high molecular weight organic substances, in addition to the pigment compositions according to the invention.

The pigment compositions according to the invention can be employed in the various high molecular weight organic materials together with the particular customary additives.

For pigmenting paints, coating compositions and printing inks, the high molecular weight organic materials and the pigment compositions according to the invention are finely dispersed or dissolved in a common organic solvent or solvent mixture, if appropriate together with additives, such as fillers, other pigments, siccatives or plasticizers. A procedure can be followed here in which the individual components are dispersed or dissolved by themselves or as a mixture and only then are all the components brought together.

In coloured materials, for example of paints, polyvinyl chloride or polyolefins, the pigment compositions according to the invention are distinguished by good general pigment properties, such as good dispersibility, high tinctorial strength and purity and good resistance to migration, heat and, in particular, light and weathering.

The following examples illustrate the invention.

EXAMPLE 1

0.08 g of a polymeric nitroxyl compound having the recurring unit of the formula

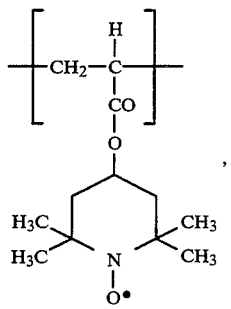

prepared as described in F. Karrer, Makromol. Chem. (1980), p. 597, having an average molecular weight $M_w=6791$ is dissolved in 20 ml of ethanol. 8 g of a 10% by weight aqueous dispersion of the pigment of the formula

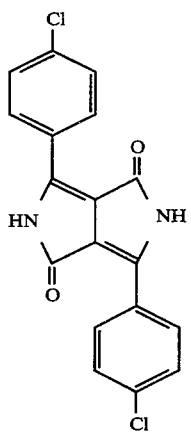

are added. After the mixture has been stirred for 12 hours, 70 ml of water are added, the suspension is filtered and the residue is dried in a drying cabinet.

The resulting stabilized pigment is incorporated into an alkyd-melamine stoving lacquer as follows.

0.4 g of pigment/nitroxyl mixture, 7.6 g of $TiO_2$, 9 ml of methyl isobutyl ketone and 30 g of stoving lacquer comprising 66.5 parts of alkyd resin ®ALKYDAL F27 (Bayer AG), 24.4 parts of melamine resin ®MAPRENAL TTK (Hoechst AG), 2.1 parts of xylene, 4.0 parts of ethylene glycol and 1.0 part of silicone oil (1% in xylene) are mixed by customary methods. The resulting lacquer is spread onto aluminium sheets and stoved at 130° C. for 30 minutes.

A control coloured coating is likewise produced in the same manner, with the exception that the pigment is employed without addition of the nitroxyl compound.

The resistance of the resulting coloured coatings to weathering is determined in accordance with the WOM test according to DIN 53387 after weathering for 500 hours.

The lacquer obtained with the pigment/nitroxyl mixture shows a significantly better resistance to weathering than the control lacquer.

EXAMPLE 2

Example 1 is repeated, with the only exception that a nitroxyl compound having the same recurring unit but with an average molecular weight $M_w=6064$ is used.

This lacquer also shows a similarly improved resistance to weathering, as in Example 1.

EXAMPLE 3

Example 1 is repeated, with the only exception that a nitroxyl compound having the same recurring unit but with an average molecular weight $M_w=7799$ is used.

This lacquer also shows a similarly improved resistance to weathering, as in Example 1.

EXAMPLE 4

0.08 g of a polymeric nitroxyl compound having the recurring unit of the formula

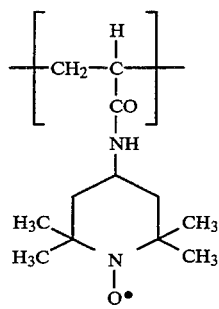

prepared as described in T. Osa et al., Chem. Letters (1988), p. 1423–1426, is dissolved in 20 ml of a mixture of ethanol/water (8:2) at pH 10 (borax buffer). 8 g of a 10% by weight aqueous dispersion of the same pigment as in Example 1 are added. After the mixture has been stirred for 48 hours, the suspension is filtered and the residue is dried in a drying cabinet.

The resulting stabilized pigment is incorporated into the same alkyd-melamine stoving lacquer (white blend) in the same manner as in Example 1.

The resistance of the resulting coloured coating to weathering shows an improvement similar to that in Example 1.

EXAMPLE 5

0.08 g of a polymeric nitroxyl compound having the recurring unit of the formula

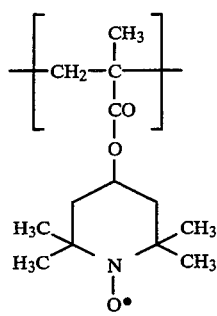

prepared as described in K. W. Lee et al., Journal of Polymeric Science, 10, 3295–3310 (1972) or 12, 1407–1420 (1974) is dissolved in 20 ml of tetrahydrofuran. 7.2 g of a 10% by weight aqueous suspension of the same pigment as in Example 1 are added. After the mixture has been stirred for 12 hours, 25 ml of water are added, the suspension is filtered and the residue is dried in a drying cabinet. When incorporated into an alkyd-melamine stoving lacquer as described in Example 1, the product results in similar weathering resistance values to the product of Example 1.

EXAMPLE 6

0.06 g of the polymeric nitroxyl compound used in Example 1 is dissolved in 10 ml of dichloroethane and 25 ml of xylene. This solution is added to 0.6 g of the pigment used in Example 1 in a flask containing 135 g of zirconium beads of average ϕ1.6–2.5 min. The flask is rotated on a roller bench for 16 hours for dispersion of the contents. The suspension is separated from the zirconium beads and filtered and the product is dried in a drying cabinet. When incorporated into an alkyd-melamine stoving lacquer as described in Example 1, the product gives similar weathering resistance values to the product of Example 1.

EXAMPLE 7

Example 6 is repeated, with the only exception that a nitroxyl compound having the same recurring unit but with an average molecular weight $M_w = 6064$ is used.

This lacquer also shows a similarly improved resistance to weathering, as in Example 6.

EXAMPLE 8

Example 6 is repeated, with the only exception that a nitroxyl compound having the same recurring unit but with an average molecular weight $M_w = 7799$ is used.

This lacquer also shows a similarly improved resistance to weathering, as in Example 6.

EXAMPLE 9

0.150 g of a polymeric nitroxyl compound having the recurring unit of the formula

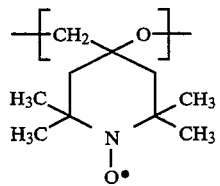

prepared by polymerization of the compound of the formula

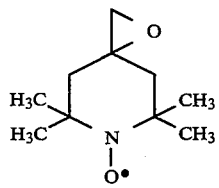

in accordance with the method described in Example 1 of U.S. Pat. No. 4,413,075, and 1.35 g of the same pigment as in Example 1 are suspended in 25 ml of methylene chloride by treatment with ultrasound for 5 minutes. The solvent is then distilled off and the residue is dried. When incorporated into an alkyd-melamine stoving lacquer as described in Example 1, the product likewise gives an improved resistance to weathering.

EXAMPLE 10

0.5 g of 4-methacryloyloxy-1-hydroxy-2,2,6,6-tetramethylpiperidine hydrochloride is polymerized by the method described by L. Kurosaki in Journal of Polymeric Science, 12, 1407–1420 (1974). 10 g of a 10% by weight aqueous dispersion of the same pigment as in Example 1 are added to the resulting solution of the polymer having recurring units of the formula

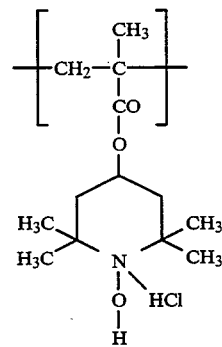

The suspension is stirred for 2 hours and then filtered and the residue is dried in a drying cabinet.

The resulting stabilized pigment is incorporated into an alkyd-melamine stoving lacquer as described in Example 1.

The lacquer shows a similarly improved resistance to weathering, as in Example 1.

EXAMPLE 11

Example 10 is repeated, with the only exception that the pH before filtration is brought to 7–8 with 30% by weight aqueous NaOH.

EXAMPLE 12

0.2 g of the polymer described in Example 8 is dissolved in 100 ml of water and 5 ml of glacial acetic acid. 10 g of a 10% by weight aqueous dispersion of the same pigment as in Example 1 are added to this solution. The suspension is stirred for 2 hours, the pH is brought to 7-8 with 30% by weight aqueous NaOH, the suspension is then filtered and the residue is dried.

The resulting stabilized pigment is incorporated into an alkyd-melamine stoving lacquer as described in Example 1.

The lacquer shows a similarly improved resistance to weathering, as in Example 1.

EXAMPLE 13

Example 1 is repeated, with the only exception that instead of the polymer described therein, a copolymer of methyl methacrylate and 4-methacryloyloxy-2,2,6,6-tetramethylpiperidine 1-oxide, i.e. having recurring units of the formulae

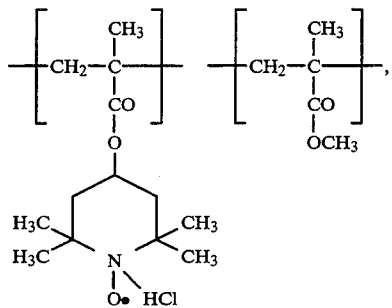

which is obtained by the method described by Lau et al. in Journal of Polymer Science (Part A: Polymer Chemistry), 30, 983-988, is employed.

The lacquer obtained as described in Example 1 with the pigment stabilized in this way shows a similar improved resistance to weathering, as in Example 1.

EXAMPLE 14

Example 1 is repeated, with the only exception that instead of the polymer used therein, the copolymer poly-[N-(1-oxy-2,2,6,6-tetramethyl-4-piperidyl)-maleic acid amide/co-styrene having the recurring unit of the formula

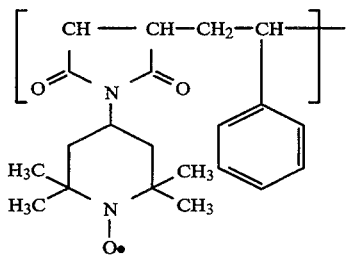

as is described by R. Seidemann et al. in Makromol. Chem. 190, 980 (1989), is employed.

The lacquer obtained as described in Example 1 with the pigment stabilized in this way shows a similar improved resistance to weathering, as in Example 1.

EXAMPLE 15

Example 1 is repeated, with the only exception that instead of the polymer used therein, a polymer having the recurring unit of the formula

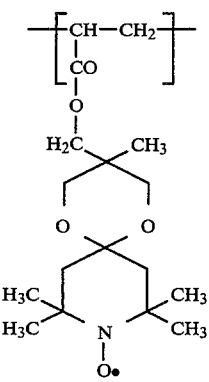

according to the description of P. Strohriegel in Makromol. Chem. Rapid Commun. 13, 125-133 (1992), is employed.

The lacquer obtained as described in Example 1 with the pigment stabilized in this way shows a similar improved resistance to weathering, as in Example 1.

EXAMPLE 16

Example 15 is repeated with a polymer having the recurring unit of the formula

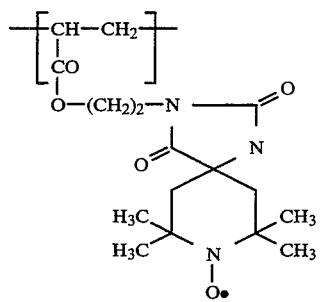

obtained in accordance with the method of P. Strohriegel described in Example 15 with the corresponding hydantoin derivative.

The lacquer obtained as described in Example 1 with the pigment stabilized in this way shows a similar improved resistance to weathering, as in Example 1.

EXAMPLE 17

0.4 g of the pigment of the formula

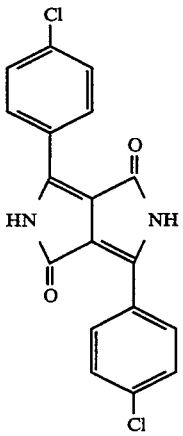

and 0.04 g of the polymer described in Example 1 are incorporated separately, but otherwise as described in Example 1, into the same alkyd-melamine stoving lacquer (white blend).

The lacquer thus obtained shows a similar improved resistance to weathering, as in Example 1.

If the polymer in this example is replaced with in each case one of the polymers described in Examples 2 to 16, the same results with respect to resistance to weathering are obtained.

EXAMPLES 18–30

If Example 8 is repeated, but the pigment employed therein is replaced with in each case one of the following pigments, the lacquers prepared with the resulting pigment compositions by the method described in Example 1 show a similar improved resistance to weathering, as in Example 1.

| Example | Pigment |
|---|---|
| 18 | |
| 19 | |
| 20 | |
| 21 | |
| 22 | C.I. Pigment Yellow 17 |
| 23 | C.I. Pigment Yellow 62 |
| 24 | C.I. Pigment Yellow 95 |
| 25 | C.I. Pigment Yellow 110 |
| 26 | C.I. Pigment Yellow 188 |
| 27 | C.I. Pigment Orange 34 |
| 28 | C.I. Pigment Red 170 |
| 29 | C.I. Pigment Red 177 |
| 30 | C.I. Pigment Blue 15:4 |

The classes to which the pigments used in Examples 22–30 belong are shown in the following table:

| C.I. designation | Pigment class |
|---|---|
| C.I. Pigment Yellow 17 | Bisazo pigment |
| C.I. Pigment Yellow 62 | Laked monoazo pigment |
| C.I. Pigment Yellow 95 | Bisazo pigment |
| C.I. Pigment Yellow 110 | Isoindolinone pigment |
| C.I. Pigment Yellow 188 | Bisazo pigment |
| C.I. Pigment Orange 34 | Bisazo pigment |
| C.I. Pigment Red 170 | Monoazo pigment |

| C.I. designation | Pigment class |
|---|---|
| C.I. Pigment Red 177 | Anthraquinone pigment |
| C.I. Pigment Blue 15:4 | Copper phthalocyanine pigment |

EXAMPLE 31

If Example 17 is repeated with 0.4 g of the pigment described in Example 18 and 0.04 g of the polymer described in Example 8, similar results with respect to resistance to weathering are obtained. The same is likewise the case if the pigment of Example 18 is replaced by in each case one of the pigments described in Examples 19–30.

EXAMPLE 32

| Formulation: | |
|---|---|
| Solution A | |
| 67.1 parts of A1: | 8.2% solution of 86 parts of cellulose acetobutyrate (25% in butyl acetate), 4 parts of zirconium octoate, 48 parts of SOLVESSO 150 ® (aromatic solvent from ESSO), 70 parts of butyl acetate and 52 parts of xylene; |
| 24.8 parts of A2: | polyester resin DYNAPOL H 700 ® (60%, from Dynamit Nobel); |
| 3.1 parts of A3: | melamine resin MAPRENAL MIF 650 ® (55%, from Hoechst AG). |
| Dispersion B | |
| 12.3 parts | of aluminium paste Silverline 3334 ® (Silverline); |
| 8.0 parts | of SOLVESSO 150 ®; |
| 59.34 parts | of A1; |
| 21.92 parts | of A2; |
| 2.74 parts | of A3. |

A 1:1 mixture of a) a dispersion, obtained by customary methods, of 5 parts of the stabilized pigment according to Example 8 in solution A and b) dispersion B is applied by means of a spray gun.

After brief exposure to air, a clear lacquer based on a thermosetting acrylic lacquer is applied and the system is stoved at 130° C. for 30 minutes. A red metal effect finish is obtained.

A control coloured coating is produced in the same manner, with the exception that the pigment is employed without addition of polymeric nitroxyl compounds.

The resistance of the resulting coloured coatings to weathering is determined by the WOM test after weathering from 250 to 2000 hours.

The coloured coating obtained with the pigment composition according to the invention results in a better resistance to weathering than the control coloured coating.

EXAMPLE 33

0.5 g of stabilized pigment according to Example 8 and 16.2 g of a nitrocellulose printing ink comprising 11 g of nitrocellulose A 250, 9 g of DOWANOL PM ® (Dow Chem.), 20 g of ethyl acetate and 60 g of ethanol are mixed by customary methods. The resulting printing ink is spread onto paper. The resistance to light is determined by the fadeometer test after exposure to light for 500 hours.

The colouration obtained with the pigment composition according to the invention shows better light-fastness than the corresponding control which is obtained in the same manner but without addition of the polymeric nitroxyl compound.

EXAMPLE 34

0.7 g of the stabilized pigment according to Example 8 is mixed in the dry state with 700 g of polyethylene VESTOLEN A 6016 ® (Hüls) and 1.4 g of calcium carbonate MILICARB ®. The mixture is then extruded twice in a single-screw extruder at 200° C. Granules thus obtained are processed to sheets on an injection moulding machine at 200° C. The resistance to weathering is determined by weathering the sheets as described for the coloured coatings in Example 1. In this case also, better resistance to weathering is obtained than in the case of the corresponding control coloured material without the nitroxyl compound.

What is claimed is:

1. A light-stabilized pigment composition comprising
   a) at least one organic pigment selected from the group consisting of diketopyrrolopyrroles, azo pigments quinacridones, quinophthalones, phthalocyanines, indanthrones, flavanthrones, pyranthrones, anthraquinones, perylenes, dioxazines, perinones, thioindigo, isoindolines, isoindolinones and metal complexes and
   b) 0.01 to 100% by weight, based on the pigment, of a condensation or addition polymer, the recurring molecular unit of which contains at least one radical containing a nitroxyl or hydroxylamino group or is substituted by a side group containing a nitroxyl or hydroxylamino group, or a copolymer thereof with other such compounds or with nitroxyl- or hydroxylamine-free components.

2. A pigment composition according to claim 1, wherein a pigment of the isoindoline, isoindolinone, metal complex or, in particular, the diketopyrrolopyrrole, azo, quinacridone, phthalocyanine, anthraquinone or perylene series is used.

3. A pigment composition according to claim 1, wherein a diketopyrrolopyrrole pigment is used in a fine form having an average particle size of 0.005 to 0.1 μm.

4. A pigment composition according to claim 1, wherein the polymeric nitroxyl compound is employed in an amount of 0.1–10% by weight, based on the pigment.

5. A pigment composition according to claim 1, wherein an organic or inorganic salt of the nitroxyl compound is used.

6. A pigment composition according to claim 1, wherein a polymeric nitroxyl compound, the recurring molecular unit of which contains at least one radical of the formula

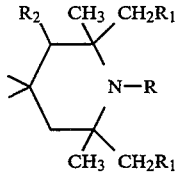

(I)

or is substituted at least once, directly or indirectly, by one of the side groups of the formulae

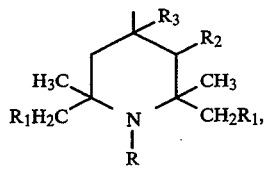 (II)

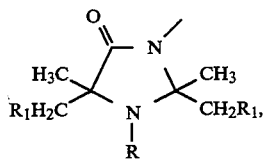 (III)

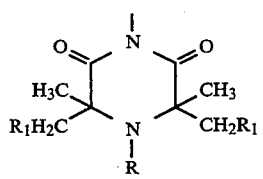 (IV)

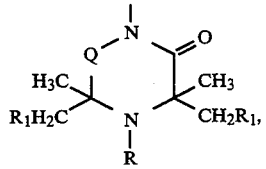 (V)

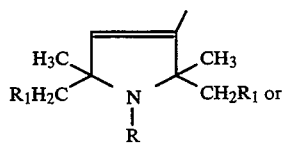 (VI)

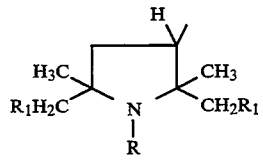 (VII)

in which
R is O. or OH,
$R_1$ is hydrogen or $C_1$–$C_4$alkyl,
$R_2$ is hydrogen or $C_1$–$C_4$alkyl,
$R_3$ is hydrogen or a free valency and
Q is —CH$_2$—, —(CH$_2$)$_2$— or —CH$_2$—CH(CH$_3$)—,
or a copolymer with other such compounds or with nitroxyl- and hydroxylamine-free components is used.

7. A pigment composition according to claim 6, wherein R in the formulae I–VII is O.

8. A pigment composition according to claim 6, wherein a polymeric nitroxyl compound, the recurring molecular unit of which contains at least one radical of the formula

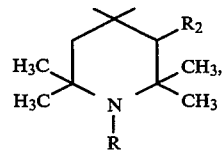 (VIII)

or is substituted at least once, directly or indirectly, by a side group of the formula

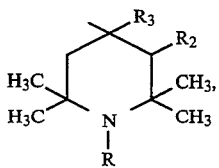 (IX)

in which R, $R_2$ and $R_3$ are as defined in claim 6, is used.

9. A pigment composition according to claim 8, wherein a polymeric nitroxyl compound, the recurring molecular unit of which contains at least one radical of the formula

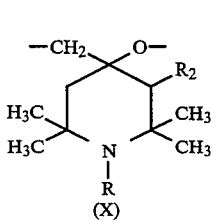 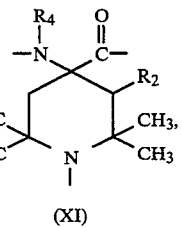
(X)   (XI)

or is substituted at least once by a side group of the formula

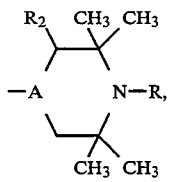 (XII)

in which
A is a group of the formula

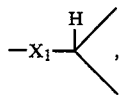 (XIII)

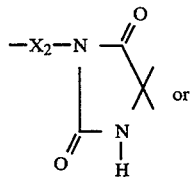 (XIV)

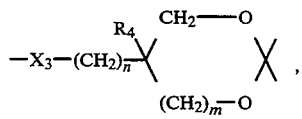 (XV)

R and $R_2$ are as defined in claim 8,
$R_4$ is hydrogen, methyl or ethyl,
m is zero or 1,
n is 1 if m is zero and is zero or 1 if m is 1,
$X_1$ is a direct bond, —O— or a group of the formula

—CO—O—, —CO—NR$_5$—,

-continued

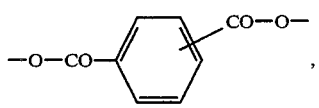

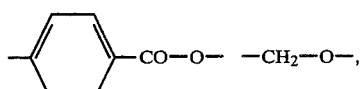

—NR₅—, —O—CH₂CH₂—NH—,

—NH—CH₂CH₂—O—,

—CO—NR₅—(CH₂)$_p$—CO—NH—,

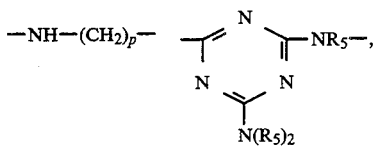

—(CH₂)$_p$—CO—O— in which
R₅ is hydrogen, C₁-C₁₂alkyl, C₅-C₇cycloalkyl or C₇-C₁₁aralkyl and
p is a number between 1 and 6,
X₂ is a direct bond or a group of the formula —(CH₂-)$_p$—, —CO—O—CHR₅—CH₂— or —CO—NR₄—CHR₅—CH₂—
wherein R₄, R₅ and p are as defined above, and
X₃ is a direct bond, —O— or a group of the formula —CO—O—, —O—CH₂—O— or —(CH₂)$_p$—
in which p is as defined above, is used.

10. A pigment composition according to claim 1, wherein a polymer having a recurring unit of the formula

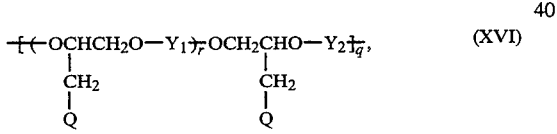 (XVI)

in which
Q is a radical of the formula XII in which A is a group

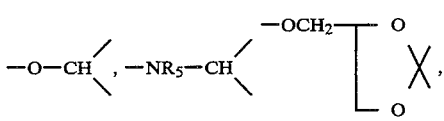

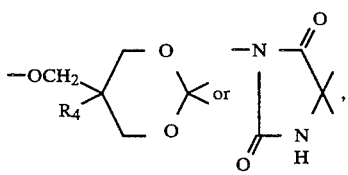

R, R₂, R₄ and R₅ are as defined in claim 9,
q is a number between 10 and 50 and
r is zero or 1, and
if r is zero,
Y₂ is an aliphatic, aromatic, araliphatic or alicyclic diacyl group having up to 20 carbon atoms, if r is 1 and Q is a radical of the formula XII in which A is

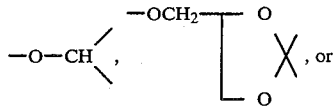

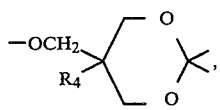

Y₁ is a saturated, aliphatic diacyl group having up to 20 carbon atoms, a benzenedicarbonyl group, a cyclohexanedicarbonyl group or a group

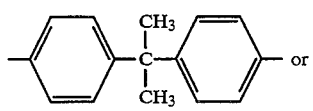

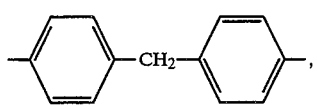

and
if r is 1 and Q is a radical of the formula XII in which A is

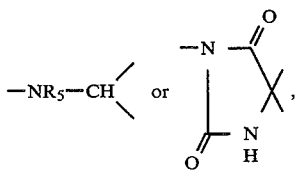

Y₁ is a saturated, aliphatic diacyl group having up to 20 carbon atoms, a benzenedicarbonyl group, a cyclohexanedicarbonyl group or a group

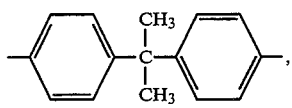

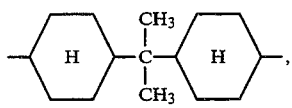

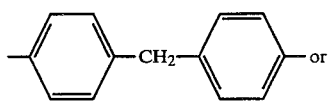

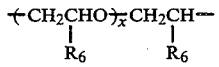

in which x is zero or a number from 1 to 8 and
R₅ is hydrogen or methyl, and
if r is 1,
Y₂ is a saturated, aliphatic diacyl group having up to 20 carbon atoms, a benzenedicarbonyl group, a cyclohexanedicarbonyl group, an alkylene group having 2 to 10 carbon atoms, a xylylene group or a group

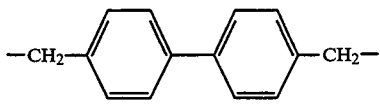

in which Y₃ is an alkylene group having 2 to 10 carbon atoms or a phenylene group, which is unsubstituted or substituted by methyl, is used.

11. A pigment composition according to claim 1, wherein a polymer having a recurring unit of the formula

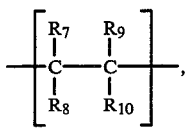 (XVII)

in which

R₇ is a group of the formula

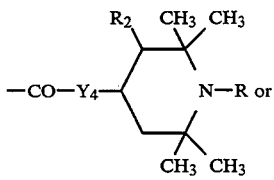

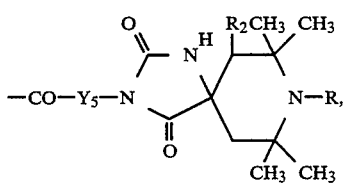

in which

R and R₂ are as defined in claim 9,

Y₄ is —O— or —NR₅—, in which R₅ is as defined in claim 9,

Y₅ is a group —O—CH₂—CH₂)$_z$ or —NR₅—CH₂—CH₂)$_z$ in which z is zero or 1,

R₈, R₉ and R₁₀ independently of one another are hydrogen or C₁-C₄alkyl,

R₉ is additionally also —COOH, and, if R₈ and R₁₀ are hydrogen,

R₇ and R₉ together form a group of the formula

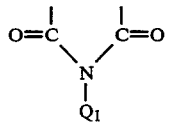

in which

Q₁ is a group

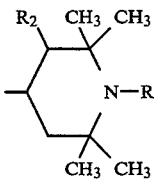

in which

R and R₂ are as defined in claim 9, or a copolymer of XVII with a compound containing at least one polymerizable double bond, at least one recurring unit XVII being present per 10 co-components, is used.

12. A pigment composition according to claim 1, wherein a copolymer of 1) at least one unsaturated derivative of the formula

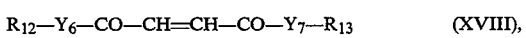

R₁₂—Y₆—CO—CH=CH—CO—Y₇—R₁₃ (XVIII), and 2) at least one comonomer of the formula

 (XIX)

in which

R₁₂ is a group of the formula XII as defined in claim 9 and

R₁₃ is hydrogen, C₁-C₁₂alkyl, which can be interrupted by —O—, C₃-C₅alkenyl, C₇-C₁₁aralkyl or C₅-C₇cycloalkyl or is the same as R₁₂, Y₆ and Y₇ independently of one another are —O— or —NR₅— in which R₅ is as defined in claim 9,

R₁₄ is hydrogen or methyl,

R₁₅ is hydrogen, C₁-C₁₂alkyl, phenyl, Cl, CN, C₁-C₄alkoxy, C₂-C₅alkanoyloxy, —CONH₂, —COOR₁₆ or —CONR₁₇R₁₈, R₁₆ is hydrogen, C₁-C₁₂alkyl, C₂-C₄hydroxyalkyl or a group of the formula XII as defined in claim 9, R₁₇ is C₁-C₁₂alkyl, C₅-C₇cycloalkyl, phenyl or a group Q₂ of the formula

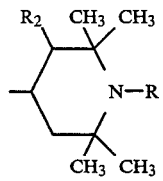

in which

R and R₂ are as defined in claim 9,

R₁₈ is hydrogen, C₁-C₁₂alkyl, C₅-C₇cycloalkyl or C₇-C₁₁aralkyl, or

R₁₇ and R₁₈, together with the N atom to which they are bonded, form a 5- to 7-membered heterocyclic ring selected from the group consisting of pyrrolidine, piperidine, morpholine or 4-alkylpiperazine, or a copolymer of 1) at least one maleimide of the formula

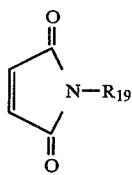

in which R 9 is a group Q₂, and 2) at least one comonomer of the formula

CH₂=CH—R₂₀ in which R₂₀ is hydrogen or C₁-C₁₂alkyl, is used.

13. A pigment composition according to claim 1, wherein a polymer having a recurring unit of the formula

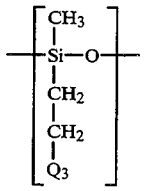    (XX)

in which

Q₃ is a group of the formula

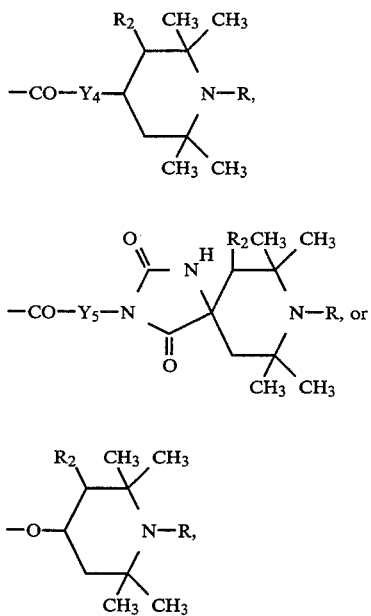

in which

R and R₂ are as defined in claim 9,

Y₄ is —O— or —NR₅— in which R₅ is as defined above,

Y₅ is a group —O—(CH₂—CH₂—CH₂)ᵤ— or —N₅—(CH₂—CH₂)ᵤ— in which z is zero or 1, or a copolymer of XX with a compound containing at least one polymerizable double bond, at least one recurring unit XX being present per 10 co-components, is used.

14. A pigment composition according to claim 1, wherein a polymer obtained by condensation of a compound of the formula

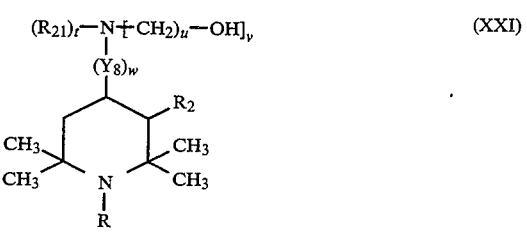    (XXI)

in which

R and R₂ are as defined in claim 9,

R₂₁ is hydrogen,

Y₈ is a group —(CH₂)ᵤ—NH—, u is a number from 1 to 4, t is zero or 1, w is zero or 1 and v is 1 or 2, with the proviso that if v is 2, t is zero, with a diisocyanate of the formula

O=C=N—Y₉—N=C=O    (XXII)

in which

Y₉ is a group

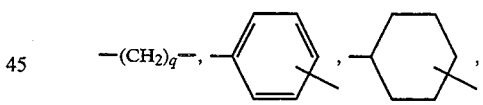

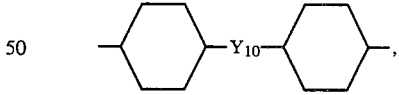

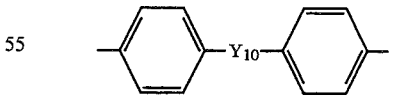

in which

Y₁₀ is a direct bond, —(CH₂)ᵦ—, —NR₂₂—, —O—, —S— or —SO₂—, a is a number from 1 to 10 and b is a number from 1 to 5 and R₂₂ is C₁-C₄alkyl, is used.

15. A pigment composition according to claim 1, wherein a polymer of the formula

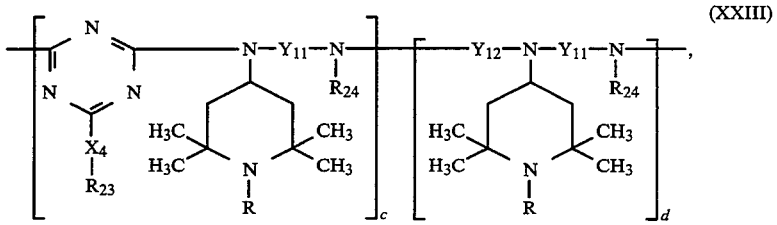

in which
R is as defined in claim 9,
$R_{23}$ is hydrogen, $C_1$-$C_{12}$alkyl, $C_2$-$C_{12}$alkyl, which is substituted by —OH, $C_1$-$C_4$alkyl or $C_2$-$C_8$dialkylamino, or is $C_3$-$C_5$alkenyl, $C_5$-$C_7$cycloalkyl, $C_6$-$C_{18}$aryl, $C_7$-$C_{11}$aralkyl or a group

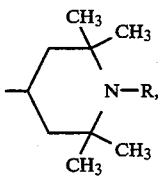

$R_{24}$ is $C_5$-$C_7$cycloalkyl, $C_6$-$C_{18}$aryl, $C_7$-$C_{11}$aralkyl or a group of the formula

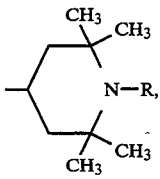

$X_4$ is —O—, —S— or —NR$_{25}$—in which $R_{25}$ can be the same as defined for $R_{23}$,
$R_{23}$ $X_4$—regarded as a single substituent can also be a heterocyclic radical selected from the group consisting of pyrrolidin-1-yl, piperidin-1-yl, hexahydroazepin-1-yl, morpholin-4-yl or methylpiperazin-1-yl,
$Y_{11}$ is $C_2$-$C_{10}$alkylene, $C_4$-$C_{10}$alkylene, which is interrupted by 1 or 2 oxygen or —NH— groups, cyclohexane, phenylene, a group

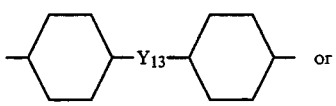 or

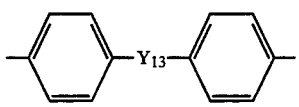

in which
$Y_{13}$ is a direct bond or $-(CH_2)_{1-10}$,
$Y_{12}$ is $C_2$-$C_{10}$hydroxyalkylene, $C_4$-$C_8$alkenylene or a group —CO—, —OOC—$Y_{11}$—COO—, —COO—$Y_{11}$—OOC—, —OCNH—$Y_{11}$—NHCO—, —HNOC—$Y_{11}$—CONH— or —OC—$Y_{11}$—CO—,
the ratio of c:d being between 4:1 and 1:4, is used.

16. A pigment composition according to claim 1, wherein a polymer having a recurring unit of the formula

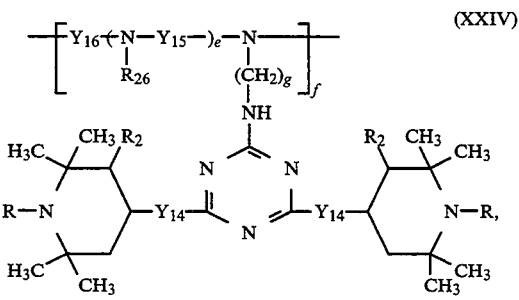

in which
R and $R_2$ are as defined in claim 9,
$Y_{14}$ is —O— or —NR$_{18}$—in which $R_{18}$ is $C_1$-$C_{12}$alkyl, $C_5$-$C_7$cycloalkyl or $C_7$-$C_{11}$aralkyl,
g can be a number from 2 to 12,
$Y_{15}$ is the group $-(CH_2)_g$,
in which g is as defined above,
or the group

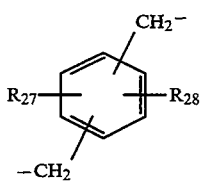

in which
$R_{27}$ and $R_{28}$ independently of one another are hydrogen or methyl, or

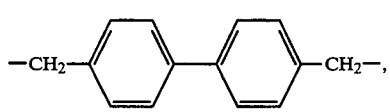

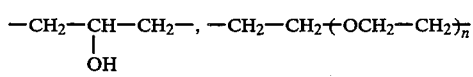

in which
h can be 1 to 3,
$R_{26}$ is hydrogen, $C_1$-$C_{12}$alkyl, a group of the formula

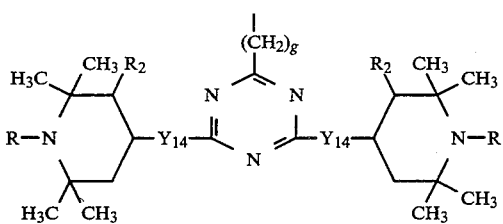

in which
R, $R_2$ and $Y_{14}$ are as defined in claim 9 and
g is as defined above,
or a group of the formula

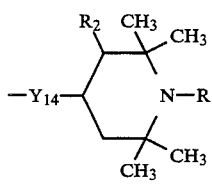

as defined above,
e is zero or 1,
$Y_{16}$, if e is zero, is as defined for $Y_{15}$ or is a group

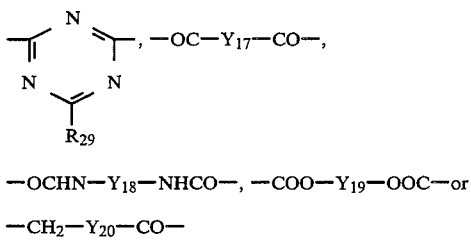
—OCHN—$Y_{18}$—NHCO—, —COO—$Y_{19}$—OOC— or

—$CH_2$—$Y_{20}$—CO— in which
$R_{29}$ is hydrogen, $C_1$–$C_{12}$alkyl, $C_5$–$C_7$cycloalkyl, $C_3$–$C_5$alkenyl, $C_7$C$_{11}$aralkyl, phenyl, which is unsubstituted or substituted by $C_1$–$C_4$alkyl, or a group

—O—$R_{30}$ or —S—$R_{30}$ in which $R_{30}$ and $R_{31}$ independently of one another are hydrogen, $C_1$–$C_{12}$alkyl, $C_5$–$C_7$cycloalkyl, $C_7$–$C_{11}$aralkyl or phenyl, which is unsubstituted or substituted by $C_1$–$C_4$alkyl, or
$R_{30}$ and $R_{31}$, together with the N atom to which they are bonded, form piperidine or morpholine, or
$R_{29}$ is a group

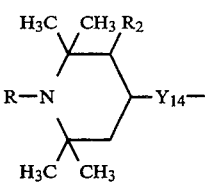

as defined above, $Y_{17}$ is

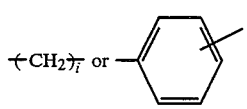

in which i is a number from 1 to 8,
$Y_{18}$ is

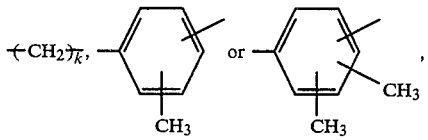

$Y_{19}$ is

in which k is a number from 2 to 18,
$Y_{20}$ is

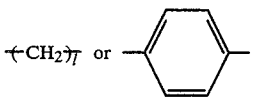

in which l is 1 or 2, and f can be a number between 2 and 2000, is used.

17. A pigment composition according to claim 1, wherein a polymer having a recurring unit of the formula

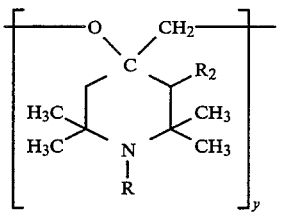

(XXV)

in which
R and R are as defined in claim 6 and
y can vary between 10 and 100, is used.

18. A pigment composition according to claim 1, wherein a polymer having a recurring unit of the formula

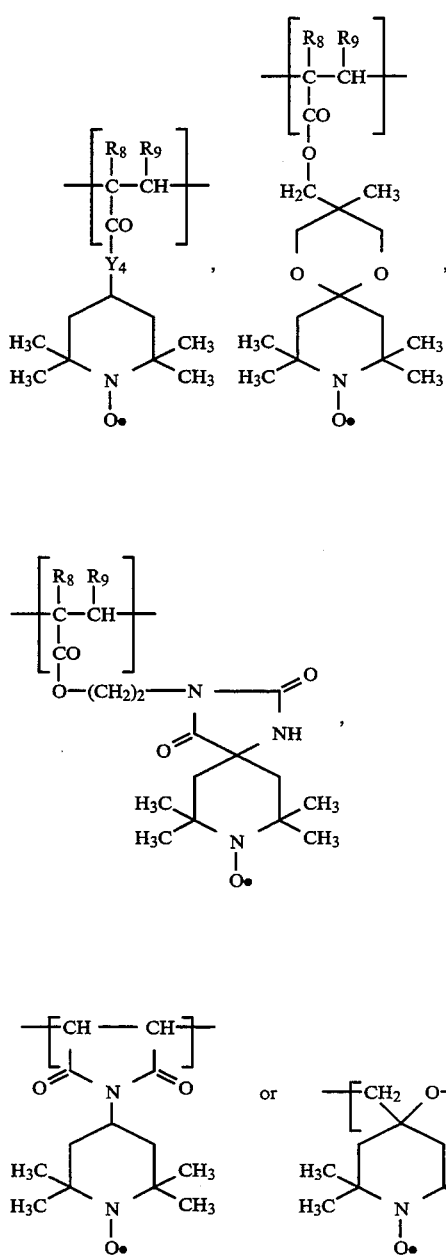

in which $R_5$ and $R_9$ independently of one another are hydrogen or methyl and $Y_4$ is —O— or —NH—, and in which recurring units of the formula

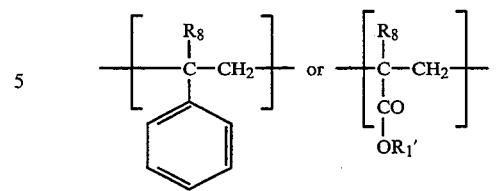

in which $R_8$ is as defined above and $R_1'$ is hydrogen or methyl, can also occur, is used.

19. A pigment composition according to claim 1, wherein a polymer having a recurring unit of the formula

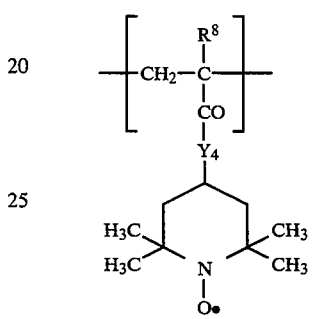

in which $R_8$ is hydrogen or methyl and $Y_4$ is —O— or —NH—, is used.

20. A process for light-and weathering-stabilization of a pigment selected from the group consisting of diketopyrrolopyrroles, azo pigments, quinacridones, quinophthalones, phthalocyanines, indanthrones, flavanthrones, pyranthrones, anthraquinones, perylenes, dioxazines, perinones, thioindigo, isoindolines, isoindolinones and metal complexes, by mixing or coating the pigment particles with 0.01 to 100% by weight, based on the pigment, of a condensation or addition polymer, the recurring molecular unit of which contains at least one radical containing a nitroxyl or hydroxylamino group or is substituted by a side group containing a nitroxyl or hydroxylamino group, or its copolymer with other such compounds or with nitroxyl- or hydroxylamine-free components.

21. A process according to claim 20, wherein, instead of the nitroxyl compound, a corresponding precursor containing the group N—OT, in which T is $C_1$-$C_{12}$alkyl, which liberates the nitroxyl compound during heat treatment, is employed.

22. High molecular weight organic material comprising a pigment composition according to claim 1.

23. High molecular weight organic material according to claim 21, which is a coating material.

24. High molecular weight organic material according to claim 22, which is an automobile paint.

* * * * *